(12) United States Patent
Nakada et al.

(10) Patent No.: US 7,401,344 B2
(45) Date of Patent: Jul. 15, 2008

(54) RECORDING MEDIUM DRIVING DEVICE

(75) Inventors: Tomonori Nakada, Tokorozawa (JP); Yuji Yamada, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 152 days.

(21) Appl. No.: 10/590,726

(22) PCT Filed: Mar. 30, 2005

(86) PCT No.: PCT/JP2005/006018

§ 371 (c)(1), (2), (4) Date: Aug. 25, 2006

(87) PCT Pub. No.: WO2005/096309

PCT Pub. Date: Oct. 13, 2005

(65) Prior Publication Data

US 2007/0214464 A1    Sep. 13, 2007

(30) Foreign Application Priority Data

Mar. 31, 2004  (JP)  .............................. 2004-103581

(51) Int. Cl.
G11B 33/12 (2006.01)
(52) U.S. Cl. ................................... 720/651
(58) Field of Classification Search ................ 720/651, 720/601, 603, 611; 369/44.32
See application file for complete search history.

(56) References Cited

U.S. PATENT DOCUMENTS

| 2004/0208093 | A1* | 10/2004 | Omori et al. | 369/44.32 |
| 2004/0261088 | A1* | 12/2004 | Hsu et al. | 720/601 |
| 2005/0076346 | A1* | 4/2005 | Matsumoto et al. | 720/601 |
| 2006/0218564 | A1* | 9/2006 | Kirihara et al. | 720/603 |
| 2007/0028248 | A1* | 2/2007 | Chen et al. | 720/601 |
| 2007/0162917 | A1* | 7/2007 | Omori et al. | 720/603 |

FOREIGN PATENT DOCUMENTS

| JP | 10-143965 | 5/1998 |
| JP | 2003-242763 | 8/2003 |
| JP | 2004-63003 | 2/2004 |

* cited by examiner

*Primary Examiner*—Tianjie Chen
(74) *Attorney, Agent, or Firm*—Kratz, Quintos & Hanson, LLP

(57) ABSTRACT

A recording/reproducing mechanism 3 includes a pickup mechanism irradiating light on a disc recording medium 4, a pickup feed mechanism moving the pickup mechanism, and a flat cover 33 having an opening 33A cut along a feeding direction of the pickup mechanism. The flat cover 33 is supported elastically in a direction toward and away from the tray 2. The tray 2 has a recessed portion allowing the flat cover 33 to move in the direction toward and away from the tray 2. A protrusion 5 is provided on the recessed portion to restrict deformation of the flat cover 33 and prevents the flat cover 33 from contacting to the disc recording medium upon dropping impact. Therefore, even if the edge of the opening 33A of the flat cover 33 is turned up due to the impact when the driver housing the disc recording medium 4 therein is dropped, the edge contacts to the protrusion 5.

5 Claims, 7 Drawing Sheets

RECORDING MEDIUM DRIVING DEVICE

TECHNICAL FIELD

The present invention relates to a recording medium driver that houses a disc recording medium in a tray.

BACKGROUND ART

There has been known recording medium drivers having a recording/reproducing mechanism that reproduces information from an optical recording medium or stores information to the recording medium. Some of the recording medium drivers include a tray on which a disc recording medium with the recording surface exposed, for example, a CD (Compact Disc) is mounted, and a recording/reproducing mechanism that reads/writes information from/to the disc recording medium while the disc recording medium is housed inside the recording medium driver with the tray and rotated at high speed (Patent Document 1).

In a case of thin type utilized for a personal computer among the above-described recording medium drivers, a recording/reproducing mechanism may be provided in a tray itself.

As such recording/reproducing mechanism, there is one provided with a pickup mechanism irradiating light on a disc recording medium, a pickup feed mechanism moving the pickup mechanism in the radial direction of the disc recording medium, and a cover formed by sheet metal processing and covering the upper surfaces of these mechanisms (the lateral surface of the disc recording medium).

The cover is cut along a feeding direction of the pickup mechanism to form an opening not to block the light being irradiated on the disc recording medium from the pickup mechanism.

FIG. 1A shows the positional relationship between a tray and a recording/reproducing mechanism according to a related art.

In FIG. 1A, the recording/reproducing mechanism includes a base 100 forming a pickup feed mechanism and having a pickup mechanism (not shown), a guide rod 101 guiding the base 100 along the radial direction of a disc recording medium, and a cover 102 being disposed above the base 100. A tray 103 is disposed above the cover 102.

Because the recording/reproducing mechanism vibrates when rotating the disc recording medium, it is required to prevent the vibration from being transmitted to the entire driver via the tray 103. Therefore, a clearance D is formed between the cover 102 and the tray 103 of the recording/reproducing mechanism.

[PATENT DOCUMENT 1] JP-A-2004-63003 (FIG. 1)

DISCLOSURE OF THE INVENTION

Problems to be Solved by the Invention

In some situations, a user may drop the recording medium driver by accident with the disc recording medium being housed. Due to this; the edge of the opening of the cover formed by sheet metal processing may be turned up at once, so that the recording surface of the disc recording medium may be damaged.

In other words, as shown in FIG. 1B, since the cover 102 is formed by sheet metal processing, the edge thereof bends due to the impact when the driver is dropped, and consequently, the bent part contacts to a disc recording medium 105 housed in the tray 103.

To prevent this, the thickness of the cover 102 may possibly be increased, or a reinforcing member such as a rib attached to enhance rigidity of the cover 102, however, these solutions cannot be provided to the thin type of the recording medium drivers.

The present invention is to provide a recording medium driver that overcomes the above-described problems, decreases the thickness of the driver and prevents a disc recording medium housed in the driver from being damaged when the driver is dropped.

MEANS FOR SOLVING THE PROBLEMS

A recording medium driver according to an aspect of the invention set forth in claim 1, includes: a tray housing a disc recording medium; and a recording/reproducing mechanism including a pickup mechanism provided in the tray and irradiating light on the disc recording medium, a pickup feed mechanism moving the pickup mechanism, and a flat cover having an opening cut along a feeding direction of the pickup mechanism, in which the flat cover is supported elastically in a direction toward and away from the tray, a recessed portion allowing the flat cover to move in the direction toward and away from the tray is formed, and a cover deformation restrictor is provided on at least one of the recessed portion and the flat cover to restrict deformation of the flat cover and prevent the flat cover from contacting to the disc recording medium upon dropping impact.

EXPLANATION OF CODES

Figure 1A:
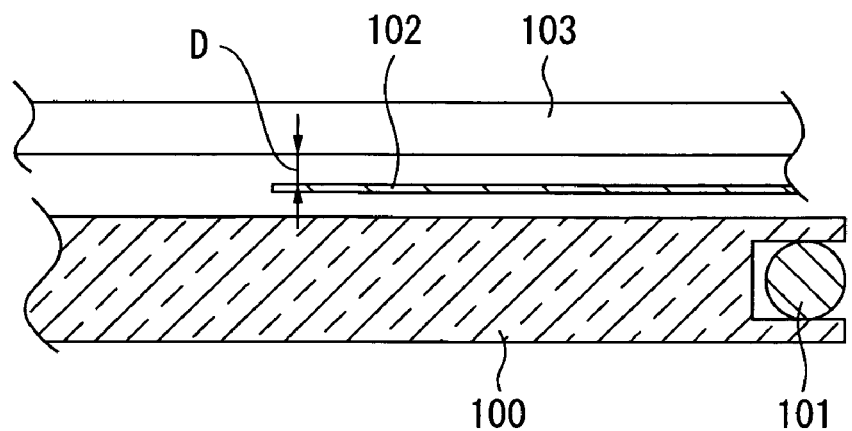
FIG. 1A is a cross section showing the positional relationship between a tray and a recording/reproducing mechanism according to a related art.
Figure 1B:
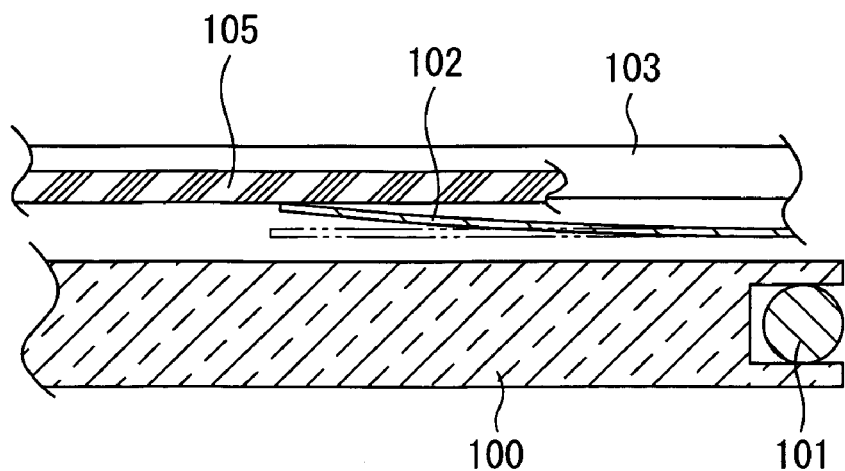
FIG. 1B is a cross section showing a cover being deformed with the configuration of FIG. 1A.

2 . . . tray
2A . . . flat portion
2B . . . wall
2C . . . rising portion
3 . . . recording/reproducing mechanism 4 . . . disc recording medium
5 . . . protrusion (cover deformation restrictor)
31 . . . pickup mechanism
32 . . . pickup feed mechanism
33 . . . flat cover
33A . . . opening
50 . . . belt member

BEST MODE FOR CARRYING OUT THE INVENTION

Embodiments of the present invention will be described below with reference to attached drawings.

Entire Configuration of Recording Medium Drive of First Embodiment

Figure 2:
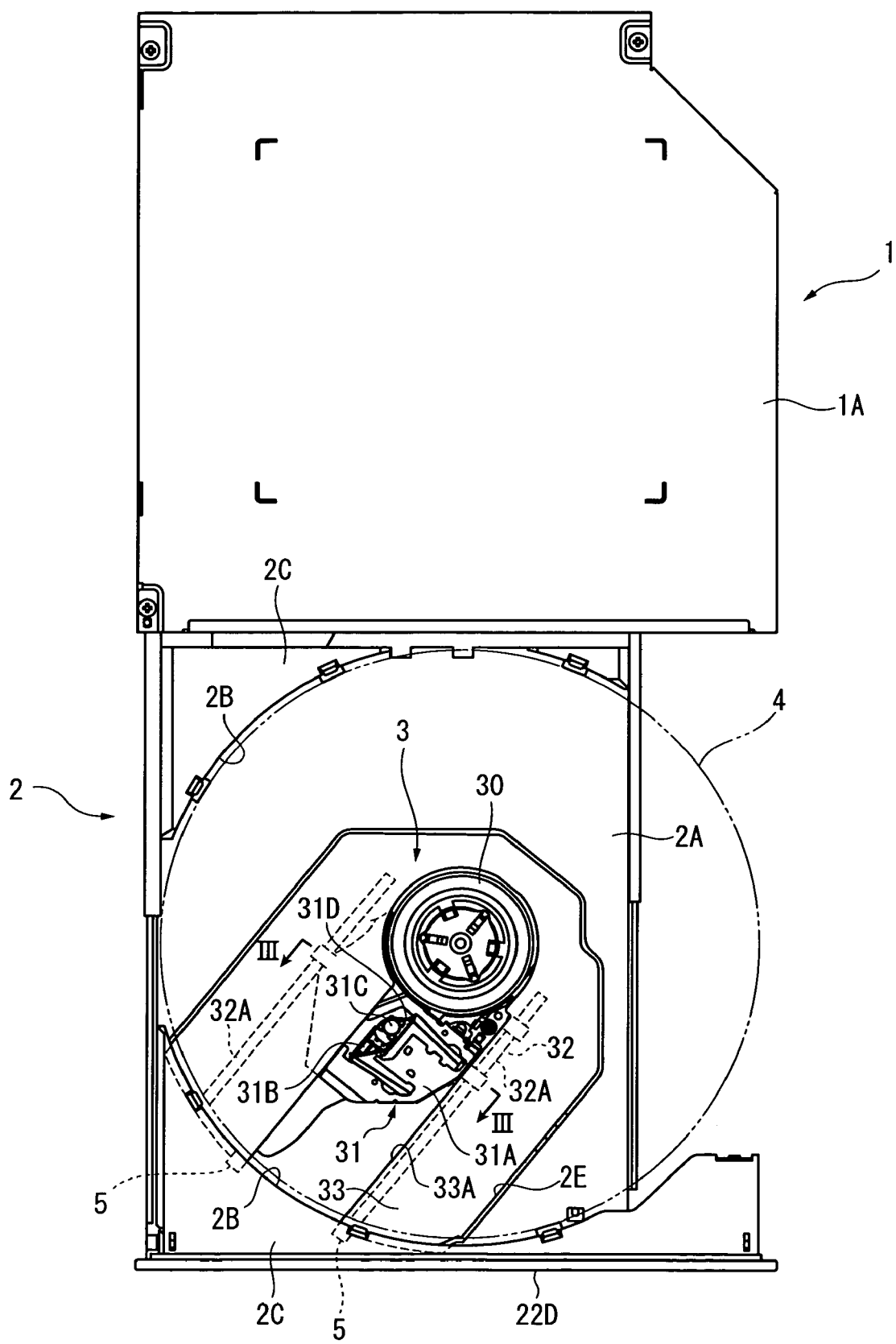
FIG. 2 is a plan view showing the entire configuration of a recording medium driver according to a first embodiment of the present invention.

FIGS. 2 and 3 show a recording medium driver according to a first embodiment of the present invention. In particular, FIG. 2 is a plan view showing the entire configuration of the recording medium driver and FIG. 3 is a cross section showing the primary portion of the first embodiment taken along the line III-III in FIG. 2. It should be noted that part of illustration of the first embodiment is omitted in FIG. 3.

In FIG. 2, the recording medium driver is a so-called slim drive formed thin and constituted from a case 1 having a housing space (not shown) therein, a tray 2 that can be housed in the housing space of the case 1, and a recording/reproducing mechanism 3 attached on the back surface of the tray 2.

The case 1 includes a bottom plate (not shown), a top plate 1A confronting the bottom plate, and side plates (not shown) provided between the top plate 1A and the bottom plate, the plates respectively being formed by sheet metal processing. One of the lateral sides is defined as an opening for housing the tray 2.

The tray 2 is molded of synthetic resin etc. to be a substantially planar rectangular, which includes a flat portion 2A confronting a plane of a disc recording medium 4, a rising portion 2C having a wall 2B rising from the outer side of the flat portion 2A and confronting the outer circumferential surface of the disc recording medium 4, and a bezel 22D attached on an end surface of the rising portion 2C.

The flat portion 2A has an opening 2E extending from the center portion thereof to a predetermined position of the wall 2B to expose a predetermined portion of the recording/reproducing mechanism 3.

The disc recording medium 4 may be any type of optical discs, magneto optical disks and magnetic disks, for instance, a CD (Compact Disc), an MD (Mini Disc), a DVD (Digital Versatile Disc), a Blu-ray Disc.

The recording/reproducing mechanism 3 includes a substantially disc-shaped disc holder 30 holding the center portion of the disc recording medium 4, a pickup mechanism 31 irradiating light on the disc recording medium 4, a pickup feed mechanism 32 moving the pickup mechanism 31, and a flat cover 33 arranged on the tray side.

The disc holder 30 is formed in a disc-shape with the center thereof coupled to a motor (not shown). As the motor rotates, the disc recording medium 4 held by the disc holder 30 rotates.

The pickup mechanism 31 includes a base 31A and an actuator 31B disposed on the base 31A. The actuator 31B has a movable section 31D with an objective lens 31C attached.

The pickup feed mechanism 32 includes guide rods 32A respectively supporting the both sides of the base 31A in a sliding manner, a lead screw (not shown) disposed parallel to one of the guide rods 32A to be rotated by the motor, and an engaging section (not shown) transmitting the rotation of the lead screw.

The flat cover 33 is formed by sheet metal processing and has an opening 33A cut along a feeding direction of the pickup mechanism 31 from the center portion thereof to the outside. The opening 33A is formed such that the objective lens confronts the recording surface of the disc recording medium 4 irrespective of an advance/retraction position of the objective lens.

The flat cover 33 is supported elastically in a direction toward and away from the tray 2 (in vertical direction). The tray 2 has a recessed portion allowing the flat cover 33 to move in the direction toward and away from the tray 2.

The periphery of the flat cover 33 extends below the rising portion 2C. The recessed portion of the rising portion 2C has a protrusion 5 (cover deformation restrictor) extending toward the periphery of the flat cover 33.

There are provided two protrusions 5 at two confronted positions so that the opening 33A is interposed between the protrusions 5.

The protrusion 5 restricts deformation of the flat cover 33 when the driver is dropped and gets an impact, and prevents the flat cover 33 from contacting to the disc recording medium 4, the protrusion 5 being a cushion member formed in a short rectangular parallelepiped. More specifically, the protrusion 5 is molded of synthetic resin such as urethane foam having elasticity, rubber, or other elastic material, and the upper surface thereof is adhered with an adhesive and fixed on the lower surface of the rising portion 2C of the tray 2.

[Positional Relationship Between Tray and Recording/Reproducing Mechanism]

FIG. 3 shows the positional relationship between the tray 2 and the recording/reproducing mechanism 3.

Figure 3A:
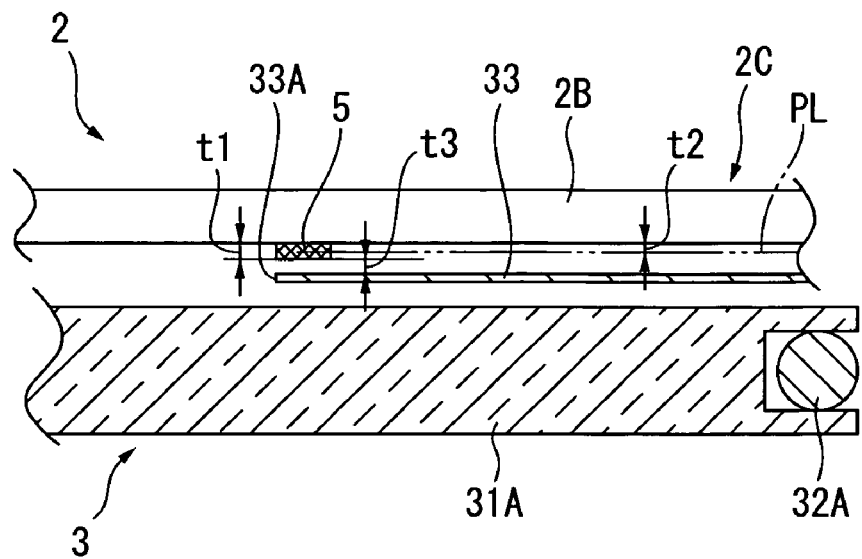
FIG. 3A is a cross section showing the primary portion of the first embodiment taken along the line III-III in FIG. 2.
Figure 3B:
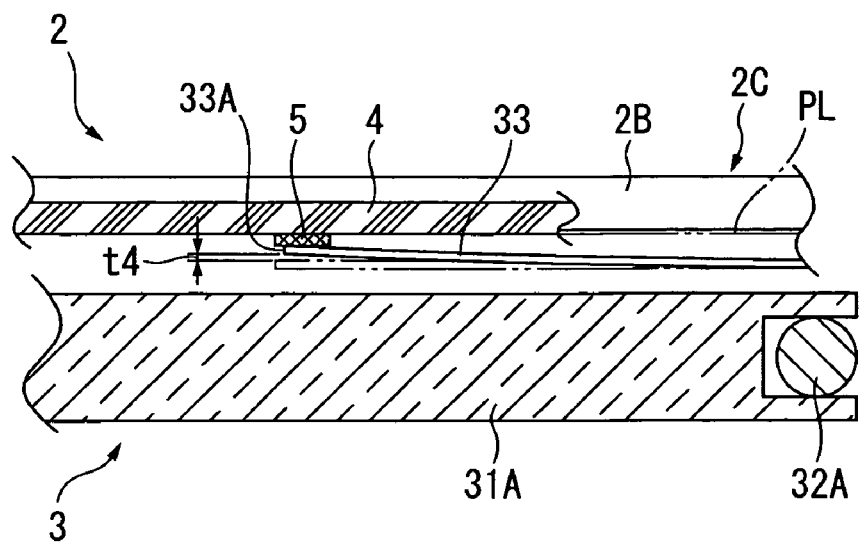
FIG. 3B is a cross section showing a cover being deformed with the configuration of FIG. 3A.

Referring to FIG. 3A, when assuming that the thickness of the protrusion 5 (a dimension between the lower surface of the rising portion 2C of the tray and the lower surface of the protrusion 5) is t1, and a dimension between a lower surface position PL of the disc recording medium 4 and the lower surface of the rising portion 2C of the tray 2, t1>t2 is established. Namely, since the lower surface of the protrusion 5 protrudes below the lower surface of the disc recording medium 4, even if the edge of the opening 33A of the flat cover 33 is turned up upon the dropping impact, the edge contacts to the protrusion 5, so that the lower surface (the recording surface) of the disc recording medium 4 will not be hurt due to the impact (see FIG. 3B).

Note that, because the disc recording medium 4 is regarded as that the recording surface (the lower surface) has a hypothetical plane with no curvature, the lower surface position PL is located at the position of the upper surface of the disc holder 30. However, the disc recording medium 4 occasionally has a slightly curved recording surface, though the curvature is extremely small.

When assuming that a dimension between the lower surface of the protrusion 5 and the upper surface of the flat cover 33 is t3, even if the flat cover 33 vibrates in the vertical direction in FIG. 3 when the recording/reproducing mechanism 3 is driven, the dimension t3 is set larger than a movement dimension t4 of the edge of the opening 33A which is turned up due to the vibration.

Concretely, there is formed between the protrusion 5 and the disc recording medium 4 a clearance t3 which allows the recording/reproducing mechanism 3 to vibrate in driven state.

Advantages of Recording Medium Drive of First Embodiment

According to the above-described recording medium driver, the following advantages can be obtained.

(1) The recording medium driver includes the tray 2 housing the disc recording medium 4 and the recording/reproducing mechanism 3 provided in the tray 2. The recording/reproducing mechanism 3 includes the pickup mechanism 31 irradiating light on the disc recording medium 4, the pickup feed mechanism 32 moving the pickup mechanism 31, and the flat cover 33 having the opening 33A cut along the feeding direction of the pickup mechanism 31. The flat cover 33 is supported elastically in the direction toward and away from the tray 2. The tray 2 has the recessed portion allowing the flat cover 33 to move in the direction toward and away from the tray 2. There is provided on the recessed portion of the tray 2 the cover deformation restrictor that restricts deformation of the flat cover 33 and prevents the flat cover 33 from contacting to the disc recording medium upon the dropping impact. Even if the edge of the opening 33A of the flat cover 33 is turned up due to the impact when the driver with the disc recording medium 4 housed therein is dropped, the edge contacts to the cover deformation restrictor, thus restricting bending of a part most easily damaged in the recording surface of the disc recording medium 4 (i.e., a part corresponding to easily bending part of a flat cover 44 (Translator's comment: correctly, 33)). Further, the flat cover 33 can utilize the known configuration, and any additional configuration such as a rib, causing increase of the thickness thereof to prevent the recording surface of the disc recording medium 4 from being damaged need not be provided in the flat cover 33, thus flatting the entire driver.

(2) There is formed between the cover deformation restrictor and the flat cover 33 a clearance t3 which allows the recording/reproducing mechanism 3 to vibrate in driven state. In other words, the clearance between the cover deformation restrictor and the flat cover 33 is not closed but remained for allowing the recording/reproducing mechanism 3 to vibrate in driven state. Accordingly, even when the recording/reproducing mechanism 3 vibrates in the thickness direction (in the vertical direction) while the disc recording medium 4 is rotated, the vibration will not be transmitted to the tray 2.

Thus, since the vibration of the recording/reproducing mechanism 3 is not transmitted to the entire driver via the tray 2, the noise caused by the vibration can be minimized.

(3) The tray 2 includes the flat portion 2A confronting the plane of the disc recording medium 4, and rising portion 2C having the wall 2B rising from the outer side of the flat portion 2A and confronting the outer circumferential surface of the disc recording medium 4. The protrusion 5 of the rising portion 2C protruding toward the flat cover 33 is defined as the cover deformation restrictor. Accordingly, the cover deformation restrictor can be formed with the simple configuration in which the protrusion 5 is provided on the rising portion 2C preformed in the tray 2.

(4) Since the protrusion 5 is formed with the cushion member, even if the edge of the opening 33A of the flat cover 33 contacts to the protrusion 5 when the driver is dropped, the protrusion 5 and the flat cover 33 will not be hurt as the protrusion 5 is elastically deformed, thus collision noise may be minimized at the contact.

(5) The two protrusions 5 are provided at the two confronted positions so that the opening 33A is interposed between the protrusions 5. Accordingly, the protrusions 5 are located in the vicinity of the edge of the opening 33A, the edge being most likely to be turned up in the flat cover 33, the vicinity of the edge can effectively be prevented from the turnup.

Next, a second embodiment of the present invention will be described with reference to FIGS. 4 and 5.

The second embodiment is different from the first embodiment in that the configuration of the cover deformation restrictor is modified, and other configuration is the same as the first embodiment.

The same components as the first embodiment will be denoted as the same reference characters to omit the description thereof.

Entire Configuration of Recording Medium Drive of Second Embodiment

Figure 4:
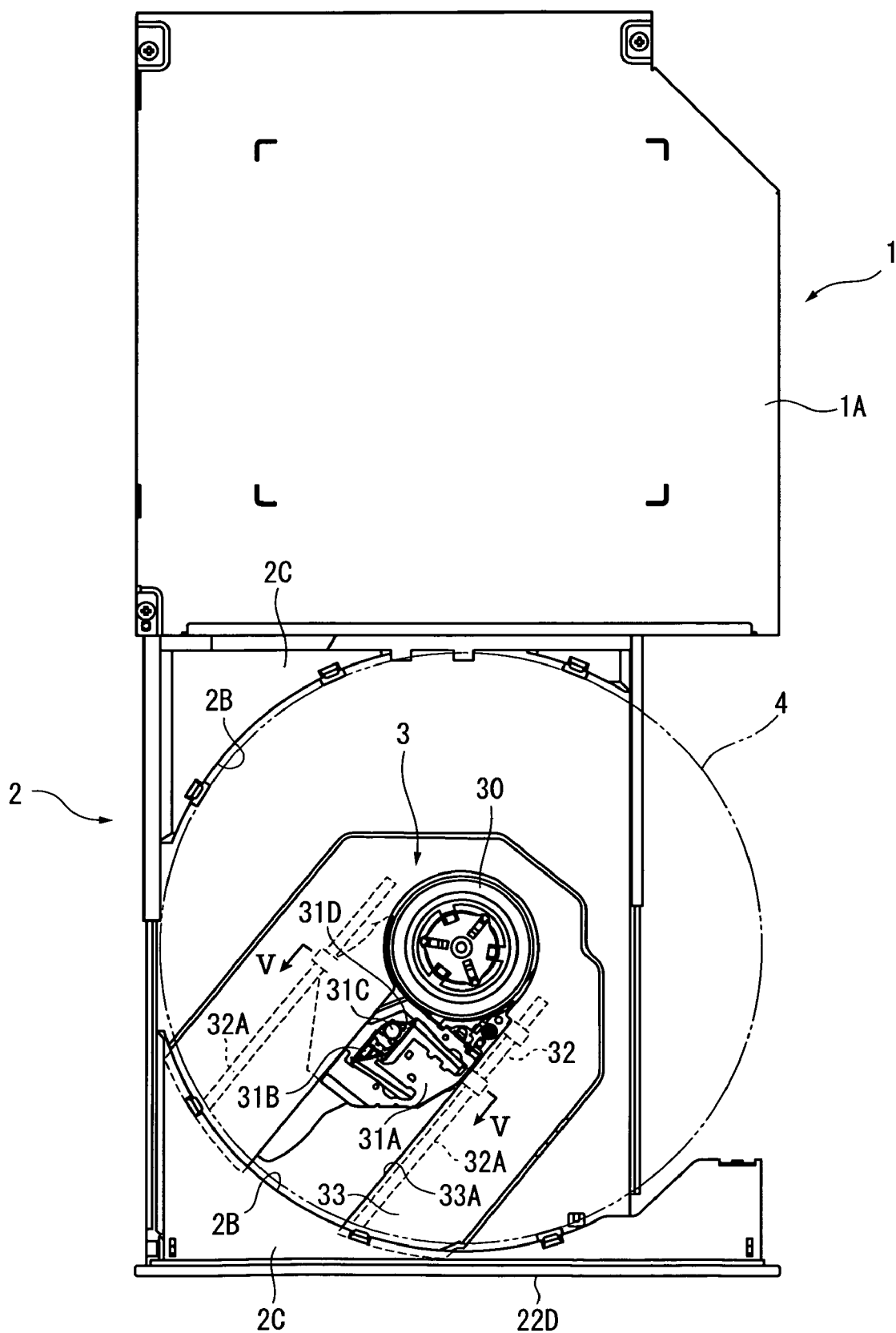
FIG. 4 is a plan view showing the entire configuration of a recording medium driver according to a second embodiment of the present invention.

FIG. 4 is a plan view showing the entire configuration of a recording medium drive according to the second embodiment, and FIG. 5 is a cross section showing the primary portion of the second embodiment taken along the line V-V in FIG. 4. It should be noted that part of illustration of the first embodiment (Translator's comment: correctly, second embodiment) is omitted in FIG. 5.

In FIG. 4, the recording medium driver of the second embodiment is a so-called slim drive in which the tray 2 can be housed in the housing space of the case 1 and the recording/reproducing mechanism 3 is attached on the back surface of the tray 2, like the first embodiment.

[Positional Relationship Between Tray and Recording/Reproducing Mechanism]

Figure 5A:
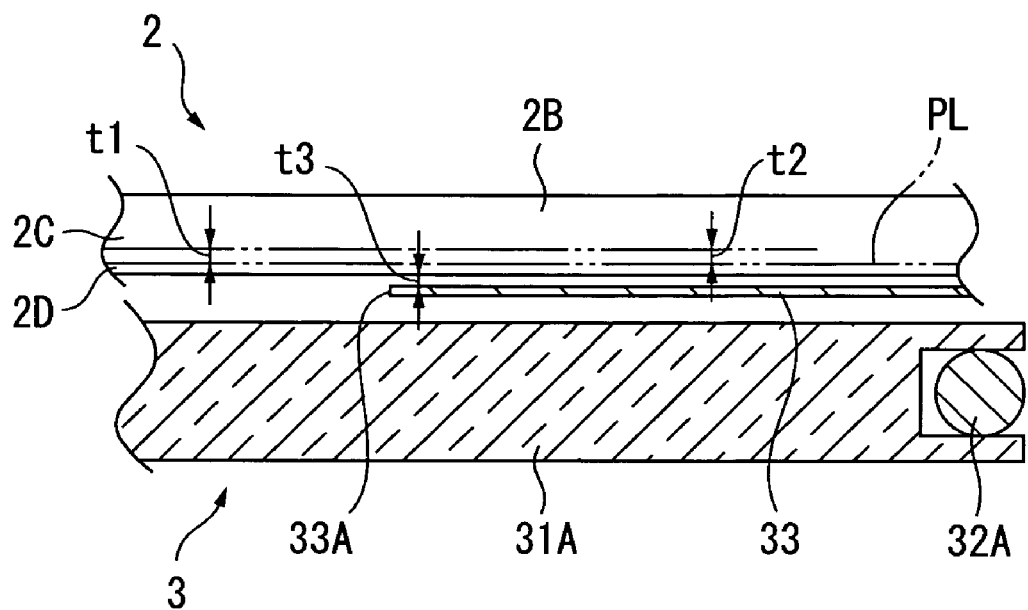
FIG. 5A is a cross section showing the primary portion of the second embodiment taken along the line V-V in FIG. 4.
Figure 5B:
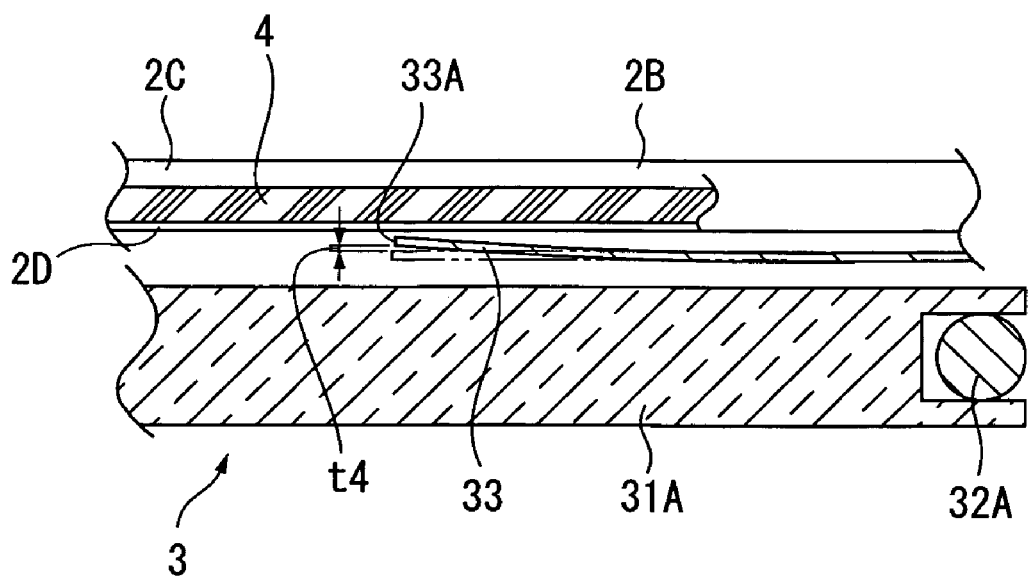
FIG. 5B is a cross section showing a cover being deformed with the configuration of FIG. 5A.

In FIG. 5A, the tray 2 of the second embodiment includes the rising portion 2C of the first embodiment, and a thick portion 2D integrally formed below the rising portion 2C along the circumferential direction of the wall section 2B, the thick portion 2D, the rising portion 2C and the flat portion 2A are integrally molded of synthetic resin by injection molding or the like.

In the second embodiment, the thick portion 2D is regarded as a rigid cover deformation restrictor.

When assuming that the thickness of the thick portion 2D (the cover deformation restrictor) is t1, and a dimension between the lower surface position PL of the disc recording medium 4 and a hypothetical plane in the same level as the lower surface of the rising portion 2C of the first embodiment, t1>t2 is established. Namely, since the lower surface of the thick portion 2D protrudes below the lower surface of the disc recording medium 4, even if the edge of the opening 33A of the flat cover 33 is turned up upon the dropping impact, the edge contacts to the protrusion 5, so that the lower surface (the recording surface) of the disc recording medium 4 will not be hurt due to the impact (see FIG. 5B).

When assuming that a dimension between the lower surface of the thick portion 2D of the tray 2 and the upper surface of the flat cover 33 is t3, even if the flat cover 33 vibrates in the vertical direction in FIG. 5 when the recording/reproducing mechanism 3 is driven, the dimension t3 is set larger than a movement dimension t4 of the edge which is turned up due to the vibration.

Concretely, there is formed between the thick portion 2D and the disc recording medium 4 a clearance t3 which allows the recording/reproducing mechanism 3 to vibrate in driven state.

Advantages of Recording Medium Drive of Second Embodiment

According to the above-described second embodiment, not only the same advantages as (1) and (2) of the first embodiment, but also the following advantages can be obtained.

(6) The cover deformation restrictor is defined by the thick portion 2D integrally formed along the circumferential direction of the wall 2B of the rising portion 2C. Accordingly, since the cover deformation restrictor is simultaneously molded along with manufacture of the tray 2, the cover deformation restrictor is easily molded.

Modifications of Embodiments

It should be noted that the recording medium driver according to the present invention is not limited to the above-described embodiments, and of course various modification can be applied without departing from the scope of the present invention.

Figure 6A:
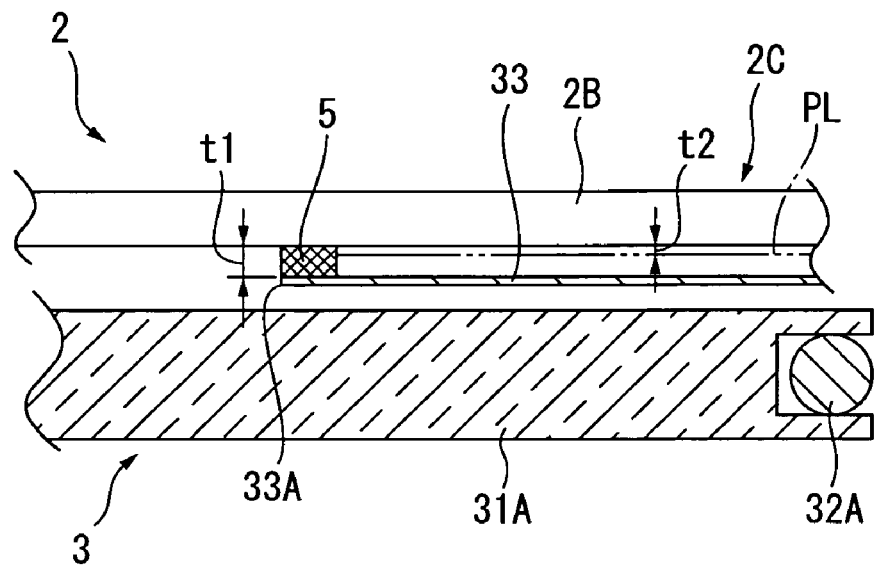
FIG. 6A is a cross section showing a modification of the present invention.
Figure 6B:
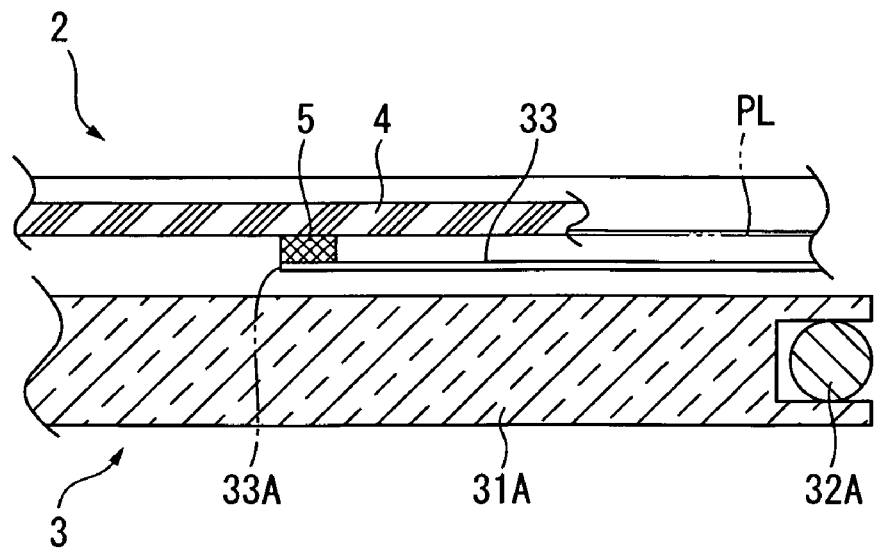
FIG. 6B is a cross section showing a cover being deformed with the configuration of FIG. 6A.

For instance, the dimension t3 is provided between the lower surface of the protrusion 5 and the upper surface of the flat cover 33 in the first embodiment, however, in the present invention, the lower surface of the protrusion 5 may always contact to the upper surface of the flat cover 33 as shown in FIGS. 6A and 6B (t3=0).

In this case, since the protrusion 5 can absorb the vibration of the recording/reproducing mechanism 3 in driven state by forming the protrusion 5 with the cushion member, the noise in driven state can be minimized.

Figure 7A:
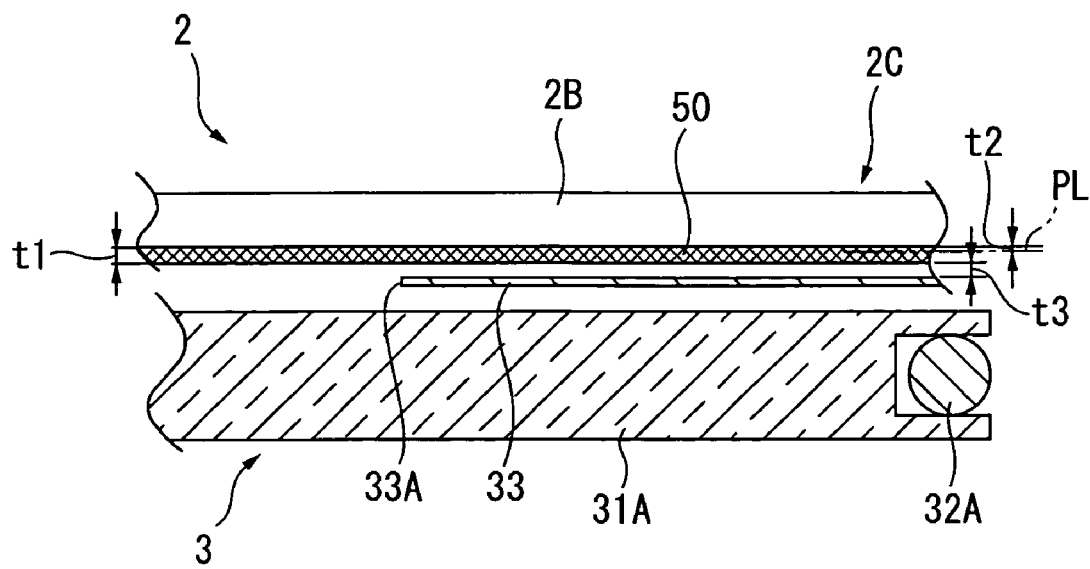
FIG. 7A is a cross section showing another modification of the present invention.
Figure 7B:
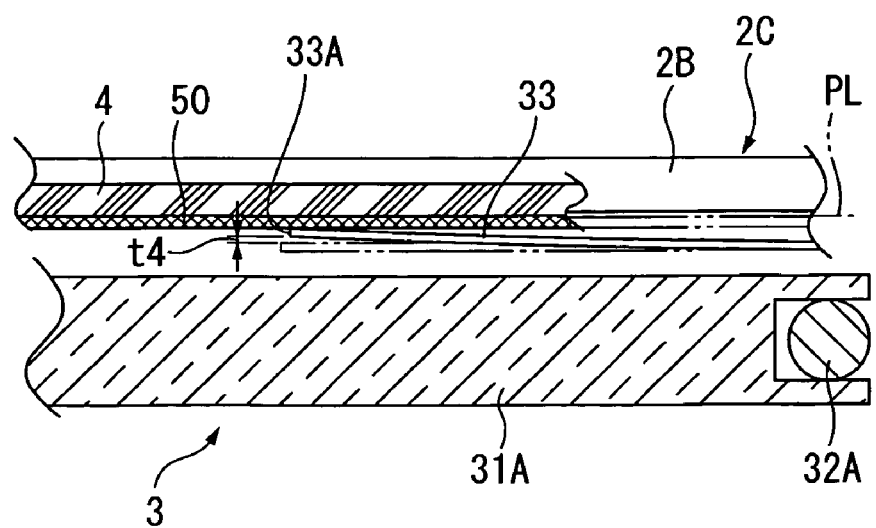
FIG. 7B is a cross section showing a cover being deformed with the configuration of FIG. 7A.

And, the cover deformation restrictor applies to the two protrusions 5 provided on the lower surface of the rising portion 2C in the first embodiment, however, in the present invention, the cover deformation restrictor may apply to a belt member 50 provided on the lower surface of the rising portion 2C as shown in FIGS. 7A and 7B.

The belt member 50 is formed with a cushion member rectangular in cross section, the belt member 50 being adhered on the lower surface of the rising portion 2C along the wall 2B of the tray. By utilizing the belt member 50, even if any part of the flat cover 33 is turned up when the driver is dropped, the turnup part surely contacts to the belt member 50, thus reliably prevents the recording surface of the disc recording medium 4 from being damaged.

Even when the protrusion 5 is utilized, the number of the protrusion 5 is not limited to two, and one, three, four, five or more protrusions 5 may be provided. In this case, the location of the protrusions 5 may appropriately be set.

Further, in the first embodiment or an embodiment shown in FIG. 7, the protrusion 5 or the belt member 50 may be formed with a rigid member instead of the cushion member as material.

Further, in the present invention, the cover deformation restrictor may be provided on the flat cover 33, or may be provided on both of the tray 2 and the flat cover 33.

Effect of the Embodiment

The recording medium driver of the present embodiment includes the tray 2 housing the disc recording medium 4 and the recording/reproducing mechanism 3 provided in the tray 2. The recording/reproducing mechanism 3 includes the pickup mechanism 31 irradiating light on the disc recording medium 4, the pickup feed mechanism 32 moving the pickup mechanism 31, and the flat cover 33 having the opening 33A cut along the feeding direction of the pickup mechanism 31. The flat cover 33 is supported elastically in the direction toward and away from the tray 2. The tray 2 has the recessed portion allowing the flat cover 33 to move in the direction toward and away from the tray 2. The cover deformation restrictor is provided on at least one of the recessed portion and the flat cover 33 to restrict deformation of the flat cover 33 and prevent the flat cover 33 from contacting to the disc recording medium upon the dropping impact. Accordingly, even if the edge of the opening 33A of the flat cover 33 is turned up due to the impact when the driver with the disc recording medium 4 housed therein is dropped, the edge contacts to the cover deformation restrictor 5, 50, thus restricting bending of a part most easily damaged in the recording surface of the disc recording medium 4 so as not to hurt the recording surface of the disc recording medium 4. Further, the flat cover 33 can utilize the known configuration, and any additional configuration causing increase of the thickness thereof, such as a rib, need not be provided in the flat cover 33, thus flatting the entire driver.

INDUSTRIAL APPLICABILITY

The present invention is applicable to a recording medium driver that houses a disc recording medium in a tray.

The invention claimed is:

1. A recording medium driver, comprising:
  a tray housing a disc recording medium; and
  a recording/reproducing mechanism including a pickup mechanism provided in the tray and irradiating light on the disc recording medium, a pickup feed mechanism moving the pickup mechanism, and a flat cover having an opening cut along a feeding direction of the pickup mechanism, wherein
  the flat cover is supported elastically in a direction toward and away from the tray, a recessed portion allowing the flat cover to move in the direction toward and away from the tray is formed, and a cover deformation restrictor is provided on at least one of the recessed portion and the flat cover to restrict deformation of the flat cover and prevent the flat cover from contacting to the disc recording medium upon dropping impact.

2. The recording medium driver according to claim 1, wherein a clearance is defined between the cover deformation restrictor and the flat cover, the clearance not being closed, but being remained for allowing the recording/reproducing mechanism to vibrate in driven state.

3. The recording medium driver according to claim 2, wherein the tray includes a flat portion confronting a plane of the disc recording medium, and a rising portion rising from the flat portion and having a wall confronting the outer circumferential surface of the disc recording medium, and the cover deformation restrictor is a thick portion integrally formed along circumferential direction of the wall of the rising portion.

4. The recording medium driver according to claim 1, wherein the cover deformation restrictor is disposed in the vicinity of the opening.

5. The recording medium driver according to claim 1, wherein the cover deformation restrictor is a cushion member.

* * * * *